(12) United States Patent
Jiménez Cortés

(10) Patent No.: US 6,275,635 B1
(45) Date of Patent: Aug. 14, 2001

(54) HOLDER FOR BUNDLES OF OPTICAL FIBERS

(75) Inventor: Juan Carlos Jiménez Cortés, Barcelona (ES)

(73) Assignee: Advanced Fiber Optics S.L., Barcelona (ES)

( * ) Notice: Subject to any disclaimer, the term of this patent is extended or adjusted under 35 U.S.C. 154(b) by 0 days.

(21) Appl. No.: 09/420,246

(22) Filed: Oct. 19, 1999

(30) Foreign Application Priority Data

Oct. 20, 1998 (ES) .................................................... 9802187
Mar. 12, 1999 (ES) .................................................... 9900519

(51) Int. Cl.[7] ................................ G02B 6/04; G02B 6/00
(52) U.S. Cl. ........................... 385/115; 385/89; 385/136; 385/137
(58) Field of Search ...................................... 385/115, 120, 385/119, 136, 137, 59, 71, 89, 116, 117; 606/15, 16

(56) References Cited

U.S. PATENT DOCUMENTS

| | | | | |
|---|---|---|---|---|
| 4,432,602 | * | 2/1984 | Margolin | 385/137 |
| 4,620,769 | * | 11/1986 | Tsuno | 385/118 |
| 4,730,096 | * | 3/1988 | Mizumoto | 219/130.01 |
| 5,013,125 | * | 5/1991 | Nilsson et al. | 385/137 |
| 5,418,874 | * | 5/1995 | Carlisle et al. | 385/76 |

* cited by examiner

*Primary Examiner*—Cassandra Spyrou
*Assistant Examiner*—Euncha Cherry
(74) *Attorney, Agent, or Firm*—Darby & Darby

(57) ABSTRACT

A holder for bundles of optical fibers. The holder has end rings which are coupled in an adjusted manner at the smooth ends thereof, the rings having internal threaded regions for receiving the body of the holder which is provided with an external thread for said coupling and an internal thread for the bush for compressing a sealing gasket of the optical fiber cable, which gasket is fitted in the internal conical end of the body of the holder, the body also having a number of external cooling grooves.

20 Claims, 6 Drawing Sheets

HOLDER FOR BUNDLES OF OPTICAL FIBERS

BACKGROUND OF THE INVENTION

1. Field of the Invention

The present invention relates to a holder for holding the ends of optical fibers constituting a bundle and for enabling them to be connected to a light-emitting device.

2. Description of Related Art

Some of the currently known holders have a body in the form of a cap, in the closed end of which an opening is formed for the introduction of the end of the fibers into its interior.

The diameter of the opening depends on the number of fibers constituting the bundle and therefore it has to be formed "in situ" by the fitter himself or at the factory.

In that type of holder, the optical fibers are held inside the cap by filling the space between the bundle formed by the optical fibers and the inner surface of the cap with an epoxy resin.

The holder is connected to the outlet of the light-emitting device by pressing, the holder being kept in the connection position owing to the friction between its outer surface and the wall of the outlet.

Those holders have a number of problems among which the following should be pointed out:

- the drilling of the cap by the operator involves an increase in the time necessary for setting up the installation and therefore an increase in the cost thereof, especially if it is borne in mind that an installation may include a large number of holders;
- given that the application of epoxy resin in the mentioned region does not provide for any clamping of the optical fibers forming the bundle, those optical fibers which are positioned in cavities defined by adjacent optical fibers may come free from the holder, especially when the bundle includes fibers having different diameters and different degrees of hardness;
- at its rear end, the holder defines a rigid outlet and therefore, if the fibers have to change direction abruptly, some of them may be flattened or come free as mentioned above;
- when the holder is connected to the outlet of the light-emitting device by pressing, the end fibers may be spaced to a greater or lesser extent from the light source in a random manner, which involves an uncontrolled variation in the efficiency of the installation.

Others of the mentioned holders are composed of a packing gland which, when tightened, brings about the deformation of a gasket having the task of exerting pressure on the optical fibers forming the bundle. Such holders have an advantage over the previous ones since they prevent the accidental release of the optical fibers; however, they have no means of solving the remainder of the problems posed above.

SUMMARY OF THE INVENTION

The holder forming the subject-matter of the present invention was devised in order to solve the problems discussed and comprises a main body having a tubular configuration, a filter-carrying ring, a sealing gasket, an element for clamping the gasket to be used, a flexible sleeve and a rear outlet mouth.

The main body has, on the inside, a frustoconical front portion for positioning the chosen gasket, a threaded intermediate portion for mounting the element for clamping the gasket and a rear member or portion for holding the front end of the sleeve once pressed into the rear portion.

The main body has, on the outside, a threaded front portion for mounting the filter-carrying ring and an intermediate portion provided with a plurality of peripheral mutually spaced and parallel channels; the purpose of the channels is to enable retractable stops provided in the outlet of the light-emitting device to be locked in any one of them; thus, the holder is prevented from being accidentally released from the light-emitting device, although it can be introduced to a greater or lesser extent into the outlet of the emitter in order to achieve adjustable control of the efficiency of the installation.

Those channels define, in the main body, a number of ribs facilitating the dissipation of heat. In order to facilitate heat dissipation, it has been provided that the main body, the clamping element, the filter-carrying ring and the split rings are produced from a material having a high thermal conductivity and sufficient strength, for example aluminium.

The filter-carrying ring, which is screwed onto the front end of the main body. defines, on the inside, a stepped configuration which enables various filters to be mounted, and, at the front, an opening for the entry of the light coming from the emitter device towards the optical fibers, passing through the mentioned filters beforehand.

In accordance with the invention, the filters to be used are preferably an infrared interference filter, or a fine-layered dichroic filter, and a filter for absorbing ultraviolet rays; optionally, a thinner, third filter of gelatin may be positioned between them in order to change the color temperature.

As mentioned above, the holder includes a sealing gasket which may comprise a set of split rings, each of which is formed by two or more portions.

All of the rings have, on the outside, a frustoconical surface having an inclination equal to that defined in the main body; however, their inside diameters are different; that feature enables the same holder to be used for bundles having a larger or smaller number of optical fibers and therefore different diameters, it merely being necessary to mount in the holder the split ring whose nominal inside diameter is the one immediately larger than that of the fiber bundle.

The element for clamping the selected ring has a tubular configuration in order to permit the passage of the bundle through its interior and is provided with a threaded portion enabling it to be mounted in the main body.

The advance of the clamping element on the main body causes the portions constituting the split ring to be displaced on the frustoconical portion of the main body, thus causing them to approach one another diametrically and causing the optical fibers forming the bundle to be trapped, thus preventing them from being released.

The gasket may also be constituted by a special form of silicone coil which can be fitted in the inner conical region of the body and on which pressure is exerted by a steel washer, preferably a nickel-plated steel washer, having a central drilled hole with a diameter suitable for the passage of the optical fiber cable.

The nickel-plated steel washers have inside diameters which are variable within a mounting set and which enable the most suitable washer to be used in each case. In a preferred example, the diameters of the washers are 15, 25 and 35 mm.

The profiled section in the form of a silicone strip constitutes a continuous tape of relatively small width, for example 15 mm, which has self-centring characteristics, and its fitting, with a variable number of turns, permits the clamping of any optical fiber cable having a diameter of from 3 to 35 mm. As a mounting unit with the holder, the silicone profiled section is given a suitable length, for example 60 cm, in order to enable it to be adapted for the purpose of obtaining the appropriate holder for the smallest size of optical fiber cable for which the holder is intended. The length of the strip or profiled section of silicone is variable in accordance with the diameter of the optical fiber cable to which the holder is fitted.

The rear region of the clamping element has diametrically opposed openings for the eventual positioning of a through-rod which facilitates its manual operation during mounting or dismounting with respect to the main body.

In accordance with the invention, the purpose of the flexible sleeve which is to be fitted to the rear region of the main body is to prevent damage to the fibers constituting the bundle if the bundle has to change direction at the outlet of the holder.

The rear mouth of the holder is composed of an annular member which has, on the inside, a toothed portion for holding the rear end of the flexible sleeve and a frustoconical surface having a diameter which increases towards its rear region in order to facilitate the introduction of the fibers of the bundle into the holder and to prevent their accelerated deterioration once secured.

BRIEF DESCRIPTION OF THE DRAWINGS

In order to complement the description provided and to aid better understanding of the features of the invention, the present description is accompanied, as an integral part thereof, by a set of drawings in which the following has been represented by way of non-limiting example.

DETAILED DESCRIPTION OF THE PREFERRED EMBODIMENTS

Figure 1:
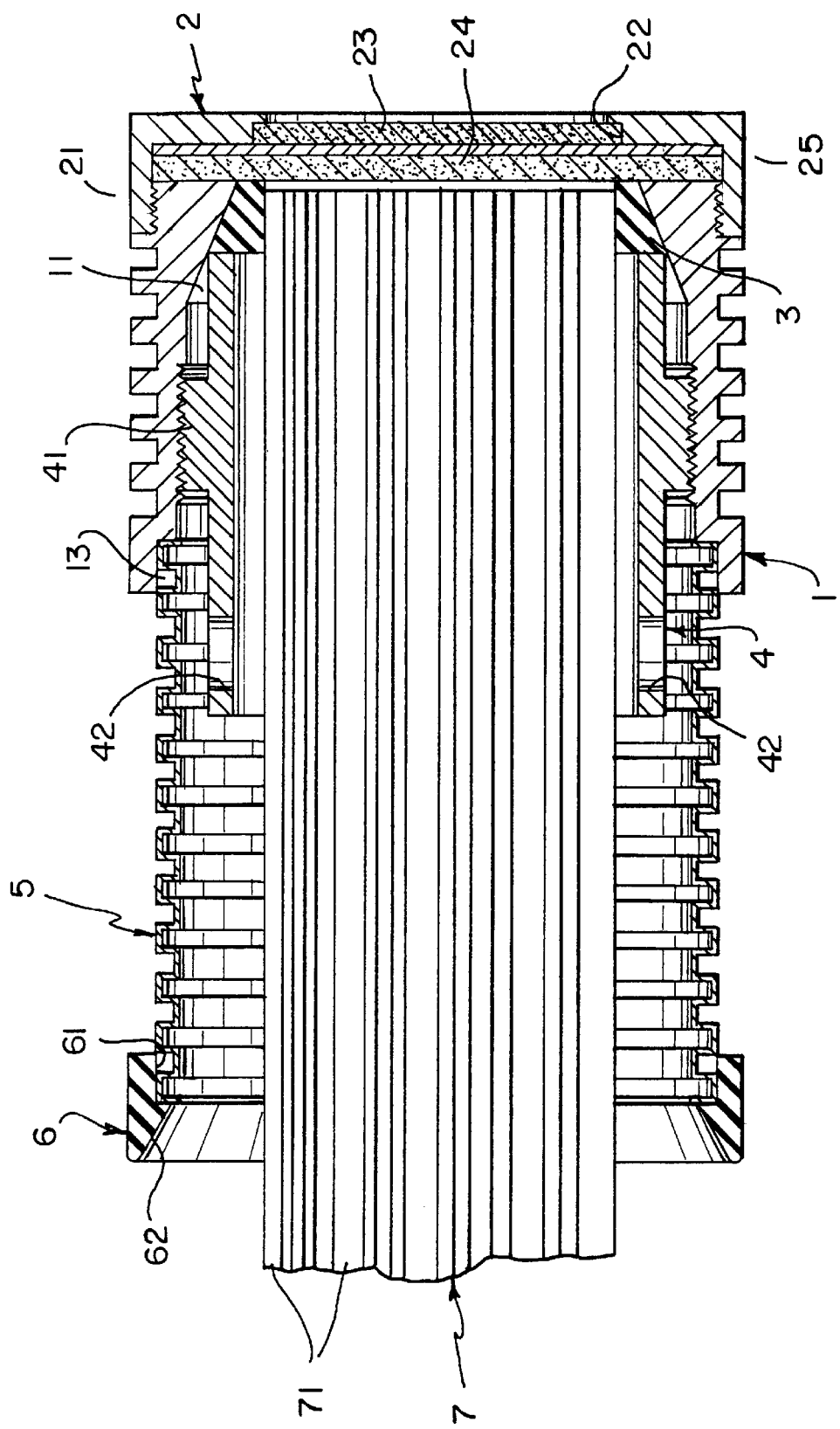
FIG. 1 is an elevation of the holder, sectioned on a vertical plane and mounted on a bundle of optical fibers.

As shown in the Figures referred to, the holder comprises a main body 1, a filter-carrying ring 2, a holding and sealing gasket, for example, in the form of a set of split rings 3, an element 4 for clamping the gasket mounted in the holder, a flexible sleeve 5 and a rear mouth 6.

The purpose of the holder is to be mounted on the end of a bundle 7 of optical fibers 71 and to enable it to be coupled to the outlet 8 of a light-emitting device.

The main body 1 has a frustoconical portion 11, a threaded intermediate portion 12, a rear portion 13 having a rough finish in order to improve adhesion, a threaded front portion 14 and a plurality of peripheral channels 15 which define ribs 16 on its outer surface.

The purpose of the peripheral channels 15 is to enable the holder to be locked by retractable stops 81 defined in the outlet 8 of the light-emitting device, it being possible to introduce the holder into the outlet 8 to a greater or lesser extent in order to vary the efficiency of the installation.

In their turn, the ribs 16, defined between the channels 15, facilitate heat dissipation by the holder.

The filter-carrying ring 2 has a threaded portion 21 enabling it to be mounted on the main body 1 and a stepped configuration 22 for holding an infrared interference filter 23, a filter 24 for absorbing ultraviolet rays and optionally an intermediate filter 25 of gelatin.

The bundle 7 is secured inside the holder by means of a gasket which in this case is in the form of split rings 3 positioned on the frustoconical portion 11 of the main body and which is pressed at its rear region by means of the clamping element 4.

When the portions 31 of the ring are displaced towards the front region of the holder, they approach one another owing to the conical shape of the portion 11, thus trapping the fibers 71.

The rings 31 of the gasket have identical external frustoconical surfaces 32, having the same inclination as the portion 11 of the main body 1; however, they have different inside diameters. In accordance with the diameter of the bundle 7, the gasket whose inside diameter is most suitable for clamping and immobilizing the fibers 71 is mounted in the holder.

The clamping element 4 has a threaded portion 41 which enables it to be mounted on the main body 1 in order to clamp the gasket 3. In order to facilitate clamping by the element 4, the latter has openings 42 into which a rod, a screwdriver or any other element acting as a lever can be introduced.

Figure 2:
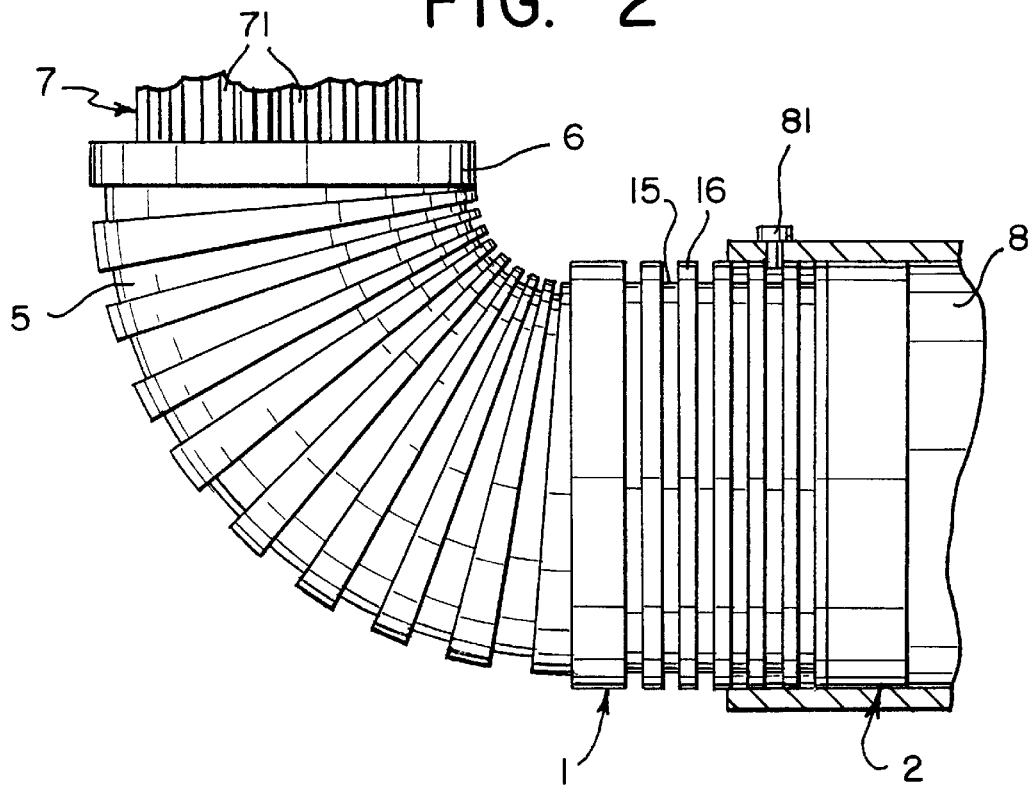
FIG. 2 is an elevation of the holder coupled to the outlet of a light-emitting device; in this Figure, the sleeve is curved, the bundle of optical fibers changing direction at the outlet of the holder.
Figure 3:
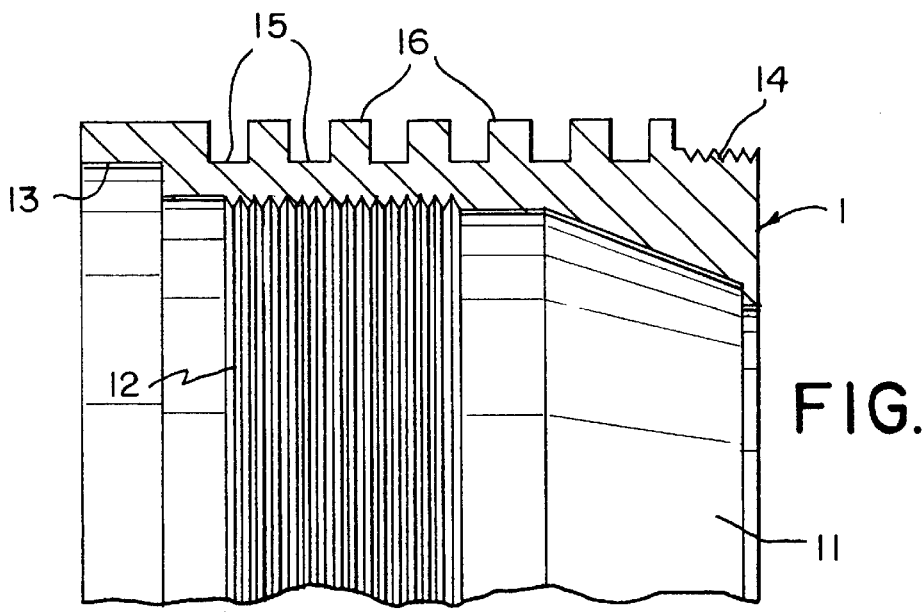
FIG. 3 is a part-sectioned detail of the main body of the holder.
Figure 4:
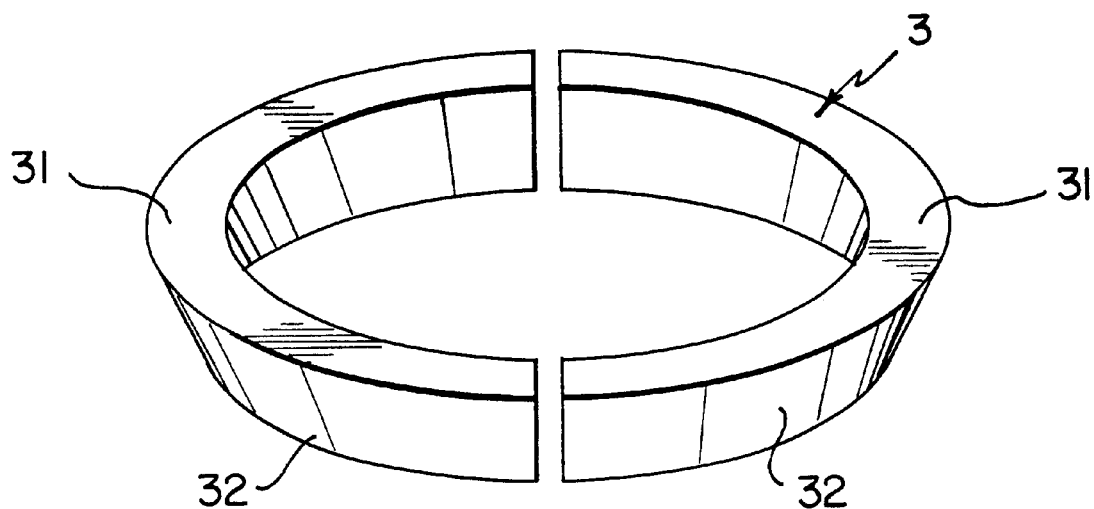
FIG. 4 is a perspective view of any one of the split rings that are to be mounted in the holder in order to hold the optical fibers constituting the bundle.
Figure 5:
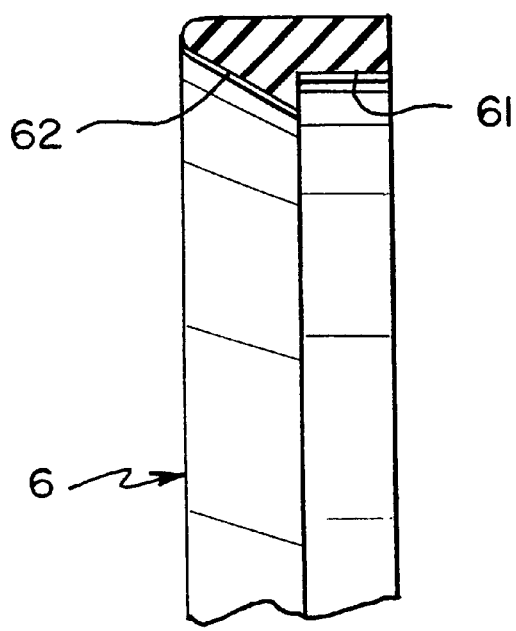
FIG. 5 is a part-sectioned detail of the rear mouth of the holder.

The flexible sleeve 5, which is preferably produced from natural rubber, is pressed into the rear end of the main body 1, being held in the coupling position by the rough finish 13 together with an adhesive. The sleeve 5 prevents the optical fibers 71 from being flattened when the bundle 7 changes direction, as shown in FIG. 2.

A mouth 6 which has a rough coupling portion 61 is coupled, likewise with pressure, to the rear end of the sleeve 5.

In order to facilitate the introduction of the optical fibers 71 into the sleeve 5, the sleeve has a frustoconical internal surface 62.

Figure 6:
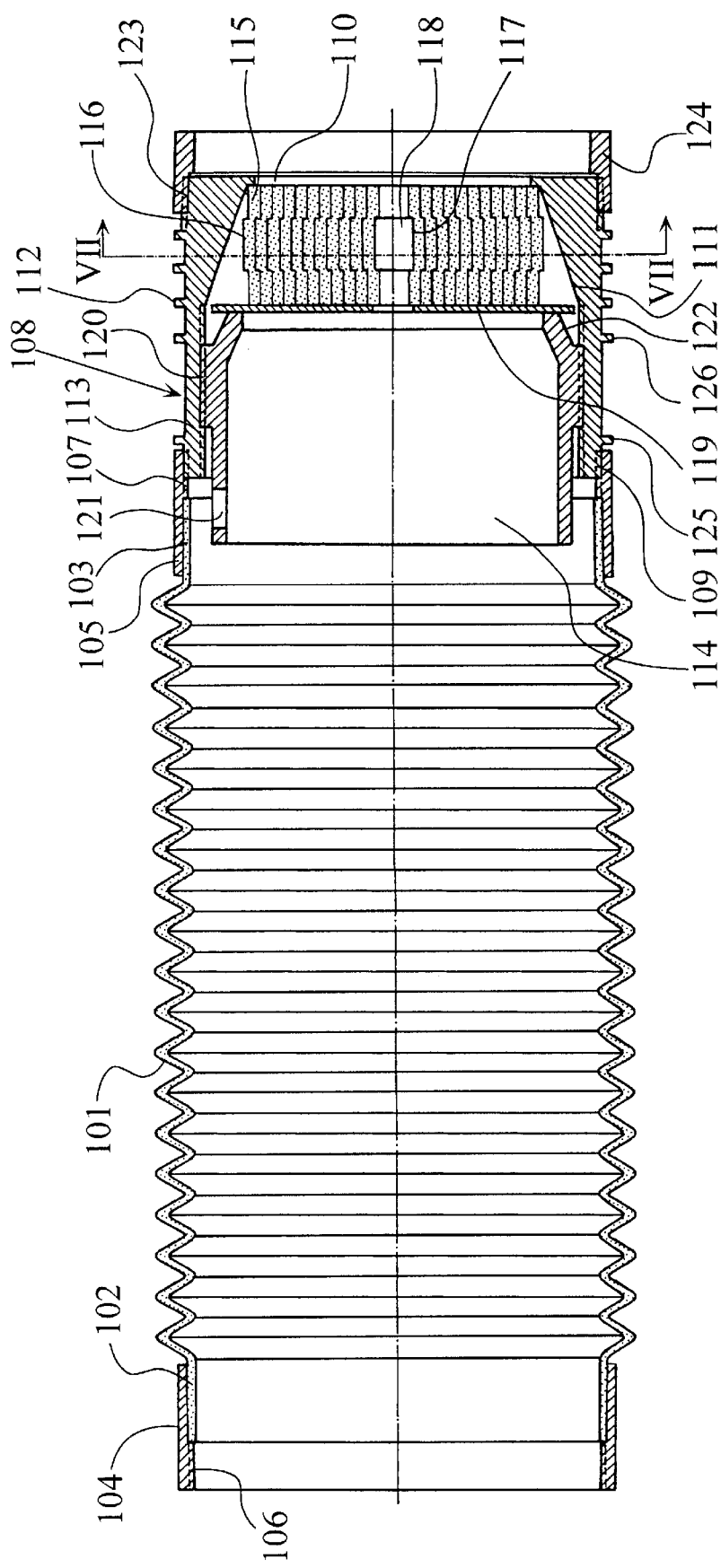
FIG. 6 is a view of a variant of the holder in longitudinal section, showing all of the integral elements in the mounted position.
Figure 7:
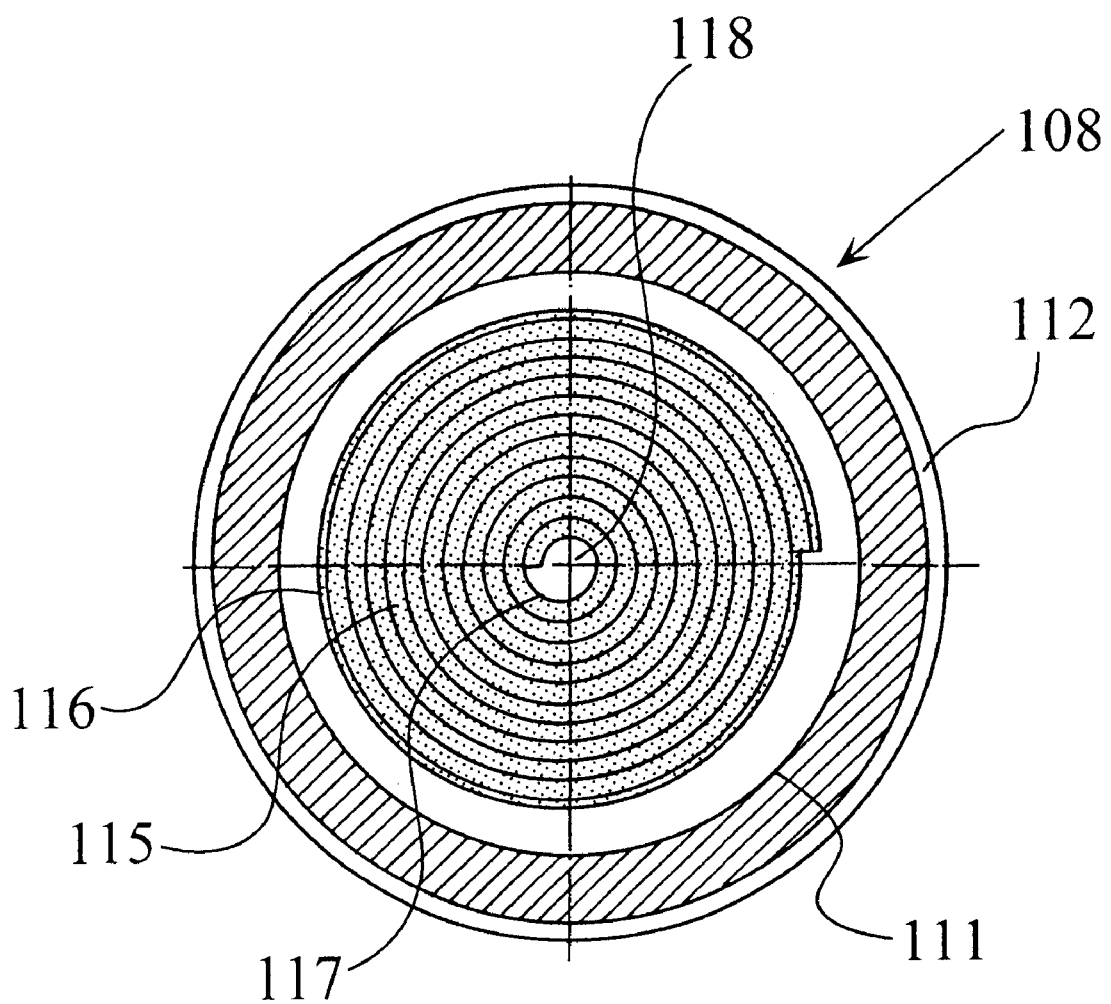
FIG. 7 is a section on the plane indicated in FIG. 6.
Figure 8:
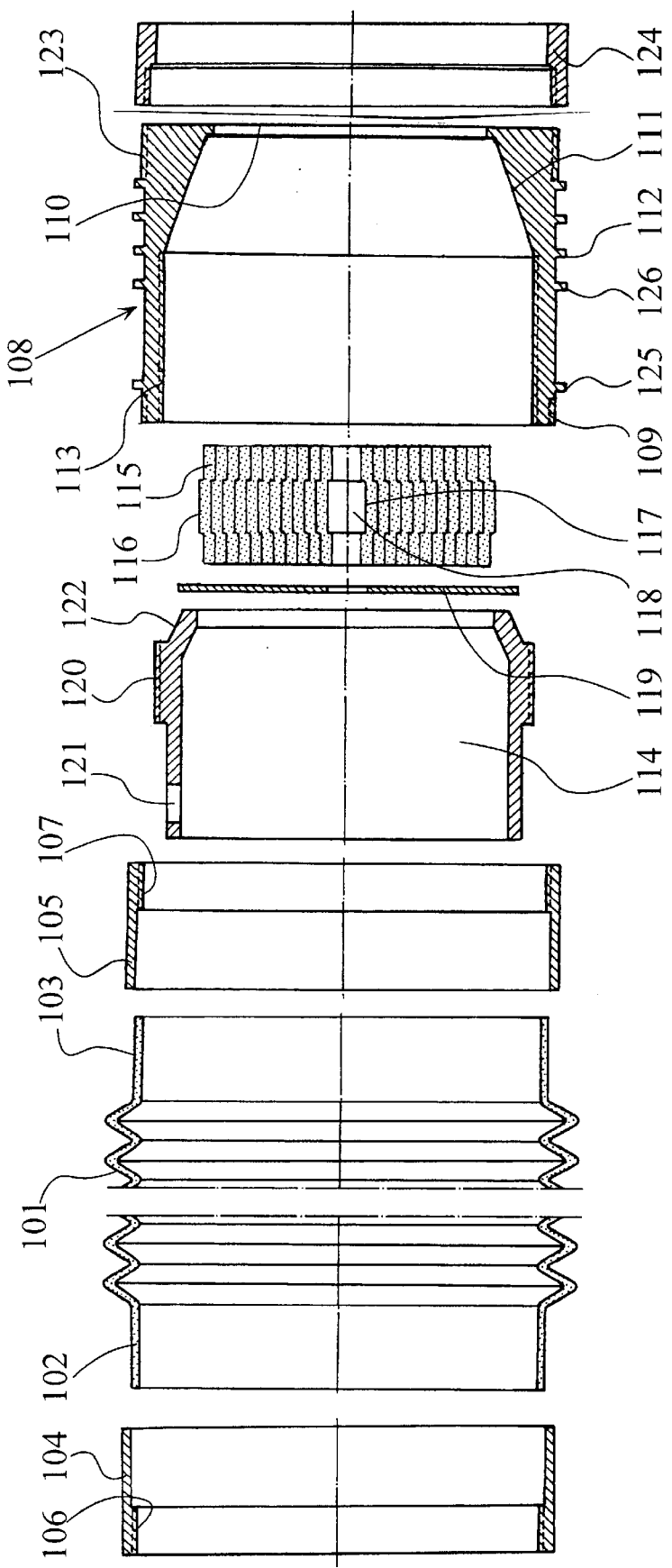
FIG. 8 is a view similar to FIG. 6, representing the various component members of the holder in the dismounted state.

In the variant of FIGS. 6 to 8, the holder forming the subject-matter of the present invention comprises bellows of natural rubber 101 which are to permit transverse bending of the holder and protection of the fibers and which have, at the ends, smooth cylindrical end portions 102 and 103 on which respective collars 104 and 105 are fitted, the collars fitting onto the outside of the end portions 102 and 103, being joined by any suitable adhesive or means, for example, by an epoxy resin. The end internal portions of the collars are threaded, as indicated by the threaded region 106 of the collar 104, the collar 105 having an identical threaded region indicated by the numeral 107.

The body 108 of the holder has a general cylindrical structure having an externally threaded end 109 so that it can fit in the internal thread of the collar 105, and having, at the other end, a narrowed portion which defines the opening 110 and an internal frustoconical region 111 which is to receive the specific means for sealing the cable, which will be explained hereinafter. The outside of the body 108 has a number of cooling slots 112 and its inside has a threaded region 113 which is to receive a clamping bush 114, the basic function of which is to act as a seal. The larger space between the first two grooves 125 and 126 is used to adjust the holder in such a manner that it can be directed more accurately.

In order to adapt the outlet opening to different optical fiber cables, a gasket in the form of a strip 115 of a silicone profiled section of the self-centring type is provided which has, for example, a stepped profile at its central portion, forming a projecting region 116 at its rear portion and a corresponding recessed region at its internal portion, which recessed region fits the projecting region 116 and is indicated by numeral 117 in FIG. 8. The sealing tape can be adjusted to the length required inside the conical region 111 of the body 108 of the holder, depending on the final opening 118 which it is desired to obtain, in a manner appropriate to the diameter of the optical fiber cable.

The silicone profiled unit 115 is fitted to the optical fiber cable by compression in the axial direction of the holder, for which purpose the holder has a pressure ring 119 which, at one face, rests on one side of the profiled unit 115 and, at the other face, receives the compression action of the bush 114.

As shown in the Figures, the bush 114 has a threaded external region 120 which is to be screwed into the inside of the body 108 of the holder, having means for its gradual clamping, for example, openings 121 for the introduction of a tool for rotating the bush 114. For improved coupling, the bush 114 has a frustoconical end 122 which is supported on the intermediate ring 119 and exerts on the latter the pressure necessary to fit the silicone tape unit 115 to the end of the optical fiber cable.

The external end portion 123 of the body 108 of the holder forming the subject-matter of the present invention is threaded so that it can receive the ring 124 which has an internal thread over part of its length and which is to hold different optical filters.

Further description is deemed unnecessary for an expert in the art to understand the scope of the invention and the advantages derived therefrom.

The terms in which this specification has been written are always to be taken in the broad and non-limiting sense.

What is claimed is:

1. A holder positionable on an end of a bundle of optical fibers so as to couple the fibers to the outlet of a light-emitting device, the holder having a front end and an opposite rear end, comprising:
   a main body having a front end and an opposite rear end configured so as to receive the bundle of optical fibers;
   a filter-carrying ring mounted to the front end of the main body;
   a gasket configured for holding and sealing the bundle of optical fibers inside the holder;
   a clamping element mounted on the main body to clamp the gasket; and
   a flexible sleeve coupled to the rear end of the main body, the flexible sleeve having a front end and an opposite rear end, the rear end of the flexible sleeve having a rear mouth defined therein.

2. The holder in accordance with claim 1, wherein the main body has an inner contour including a frustoconical portion for supporting the gasket, a threaded intermediate portion for mounting the clamping element, and a rear portion configured to hold the front end of the flexible sleeve, once coupled to the main body.

3. The holder in accordance with claim 1, wherein the main body has an outer contour including a threaded front portion for mounting the filter-carrying ring, a plurality of peripheral channels and peripheral ribs for dissipating heat.

4. The holder in accordance with claim 3, wherein the plural peripheral channels are arranged for locking, in a variable position, retractable stops defined in the outlet of a light-emitting device.

5. The holder in accordance with claim 1, wherein the filter-carrying ring has a threaded portion mountable on the front end of the main body and an internal stepped configuration for holding at least one of an infrared filter, a filter for absorbing ultraviolet rays, and an intermediate filter of gelatin.

6. The holder in accordance with claim 2, wherein the sealing gasket includes a plurality of split rings selectively coupled to hold and seal the bundle of optical fibers.

7. The holder in accordance with claim 6, wherein each of the split rings have outer contours with a frustoconical surface of substantially equal inclination and inner contour of different diameters.

8. The holder in accordance with claim 7, wherein the frustoconical surfaces of the split rings have an inclination substantially identical to the frustoconical portion of the main body.

9. The holder in accordance with claim 1, wherein the clamping element has an outer contour including a threaded portion mountable on a threaded portion of the main body.

10. The holder in accordance with claim 9, wherein the clamping element, proximate the rear end, has openings defined therein to facilitate manual clamping.

11. The holder in accordance with claim 1, wherein the rear mouth of the flexible sleeve comprises a tooth portion configured to hold the rear end of the flexible sleeve and a frustoconical portion having a diameter that increases towards the rear end of the holder.

12. The holder in accordance with claim 1, wherein the gasket comprises a variable length strip.

13. The holder in accordance with claim 12, wherein the strip is made of silicone and has a self-centering profile.

14. The holder in accordance with claim 1, further comprising a pressure ring disposed between the clamping element and main body, the clamping element having a frustoconical end region tapering towards the pressure ring to form a seal therebetween.

15. The holder in accordance with claim 1, further comprising:
   a bellow connected at one end to the rear end of the clamping element by a first collar and a second collar mounted to an opposite end of the bellow.

16. The holder in accordance with claim 15, wherein the first and second collars are identical.

17. The holder in accordance with claim 15, wherein the collars are adhered to the ends of the bellow using an adhesive.

18. The holder in accordance with claim 17, wherein the adhesive is an epoxy resin.

19. The holder in accordance with claim 13, wherein the self-centering silicon profile of the strip has, on its internal face, a recessed region and, on its external face, a projecting region insertable in the recessed region of the profile section.

20. The holder in accordance with claim 3, wherein one of the plurality of peripheral channels is larger than the other channels.

* * * * *